(12) United States Patent
Shin et al.

(10) Patent No.: US 6,908,877 B2
(45) Date of Patent: Jun. 21, 2005

(54) SUPPORTED POLYMERIZATION CATALYST USING A CATALYST PRECURSOR HAVING FUNCTIONAL GROUP AND SURFACE MODIFIED CARRIER AND OLEFIN POLYMERIZATION USING THE SAME

(75) Inventors: Sang-Young Shin, Taejeon (KR); Choong-Hoon Lee, Taejeon (KR); Eun-Jung Lee, Taejeon (KR); Jae-Seung Oh, Taejeon (KR)

(73) Assignee: LG Chem. Ltd., Seoul (KR)

( * ) Notice: Subject to any disclaimer, the term of this patent is extended or adjusted under 35 U.S.C. 154(b) by 0 days.

(21) Appl. No.: 10/297,816
(22) PCT Filed: May 23, 2002
(86) PCT No.: PCT/KR02/00979
§ 371 (c)(1), (2), (4) Date: Dec. 10, 2002
(87) PCT Pub. No.: WO02/094841
PCT Pub. Date: Nov. 28, 2002

(65) Prior Publication Data
US 2003/0166455 A1 Sep. 4, 2003

(30) Foreign Application Priority Data
May 25, 2001 (KR) .......................... 2001-28995

(51) Int. Cl.$^7$ .............................. B01J 31/38; C08F 4/44
(52) U.S. Cl. ....................... 502/152; 502/155; 502/167; 526/127; 526/129; 526/161; 526/171; 526/943
(58) Field of Search ................................ 502/152, 155, 502/167; 526/127, 129, 161, 171, 943

(56) References Cited

U.S. PATENT DOCUMENTS 4,524,141 A   6/1985   Pullukat et al.

FOREIGN PATENT DOCUMENTS

WO   WO 00/71587 A1   11/2000
WO   WO 00/78827 A1 * 12/2000

* cited by examiner

Primary Examiner—Robert D. Harlan
(74) Attorney, Agent, or Firm—Birch, Stewart, Kolasch & Birch, LLP

(57) ABSTRACT

Support within the disclosure of the present application can only be found for the treatment of the dehydrated silica catalyst carrier with a silazane compound and not with a silane compound. The search has therefore been restricted to silazane treated silica supports

7 Claims, No Drawings

SUPPORTED POLYMERIZATION CATALYST USING A CATALYST PRECURSOR HAVING FUNCTIONAL GROUP AND SURFACE MODIFIED CARRIER AND OLEFIN POLYMERIZATION USING THE SAME

BACKGROUND OF THE INVENTION (a) Field of the Invention

The present invention relates to a supported metallocene catalyst using a metallocene compound having a functional group easy to prepare a supported metallocene catalyst for an olefin polymerization, and an olefin polymerization process using the supported catalyst.

(b) Description of the Related Art

In 1976, a German professor Kaminsky has reported that methylaluminoxane (MAO) compound obtained from partial hydrolysis of trimethylaluminum can be used as a cocatalyst and zirconocenedichloride compound can be used as a catalyst in an olefin polymerization (A. Anderson, J. G. Corde, J. Herwig, W. Kaminsky, A. Merck, R. Mottweiler, J. Pein, H. Sinn, and H. J. Collmer, Angew Chem, Int. Ed. Edgl., 15, 630, 1976).

Afterwards, Exxon has revealed that molecular weight and activity of a produced polymer can be controlled by changing substituents on cyclopentadienyl ligand, and applied for a patent (U.S. Pat. No. 5,324,800) regarding an olefin polymerization using a metallocene compound having various substituents.

The homogeneous olefin polymerization catalyst shows unique polymerization properties that cannot be embodied by the existing Ziegler-Natta catalyst. Namely, a molecular weight distribution of produced polymer is narrow, copolymerization is easy, and a distribution of the second monomer is uniform. For propylene polymerization, stereoselectivity of a polymer can be controlled according to the symmetry of a catalyst. These unique properties made it possible to synthesize a novel polymer that could not be obtained by the existing Ziegler-Natta catalyst and also made it possible to prepare a resin with physical properties required by consumers. For these reasons, said catalyst is actively studied.

In a gas-phase process or a slurry process, a particle shape or apparent density of a polymer should be controlled in order to increase fluidity of polymer and yield of reactor per unit volume, and fouling problem, adhesion of polymer to a wall surface of a reactor, should be removed for continuous operation. In order to solve these problems, a metallocene catalyst should be supported in an appropriate carrier.

Generally, known processes for preparing a supported metallocene catalyst are as follows:

A metallocene compound is physically adsorbed and supported on a carrier, and then contacted with aluminoxane (W. Kaminsky, Makromol. Chen., Rapid Commun. 14, 239 (1993));

Aluminoxane is supported on a carrier and then a metallocene compound is supported thereon (Soga K., Makromol. Chen. Rapid Commn., 13, 221 (1992); U.S. Pat. No. 5,006,600; U.S. Pat. No. 5,086,025);

A metallocene compound is contacted with aluminoxane and then it is supported on a carrier (U.S. Pat. No. 5,240,892).

It is also known that a part of a ligand of a metallocene compound is chemically bonded to a carrier to prepare a supported metallocene catalyst. It is known that, in order to prepare a supported metallocene catalyst, a ligand is attached to a carrier surface through a chemical bond and then a metal is attached to the ligand (K. Soga, H. J. Kim, T. Shiono, Makromol, Rapid Commun. 15, 139 (1994), Japanese Patent Publication Hei 6-56928, U.S. Pat. No. 5,466,766).

It is also known that a metallocene compound having functional groups easy to react with a carrier is firstly prepared and then it is reacted with a carrier to prepare a supported metallocene catalyst. Wherein silicone-based functional groups such as alkoxysilane and halosilane are mainly used (E.P. Laid-open Publication No. 293815, U.S. Pat. No. 5,767,300, E.P. Laid-open Publication No. 839836, Korean Patent Application Nos. 98-12660 and 99-06955). However, these metallocene compounds having silicone-based functional groups are not easy to synthesize and the stability thereof are not good. For examples, E.P. Laid-open Publication No. 839836 describes a metallocene compound having $OSiMe_3$ functional group, but it cannot be commercially used because an yield of the last step for introducing zirconium is unfavorable as 28~51%.

U.S. Pat. No. 5,814,574 has disclosed a polymerization catalyst supported by binding a metallocene compound having Lewis acid functional groups selected from alkoxy alkyl, heterocycle oxygen radical or alkyl heterocycle oxygen radical to an inorganic carrier. U.S. Pat. No. 5,767,209 has described a preparation of a supported catalyst by binding a metallocene compound having functional groups with Lewis basicity including oxygen, silicone, phosphorous, nitrogen or sulfur to an inorganic carrier in the absence of aluminoxane, and a polymerization process by contacting the catalyst with at least one olefin at pressure and temperature sufficient to cause a polymerization. However, for binding to an inorganic carrier through a functional group with Lewis basicity, a carrier surface must have Lewis acidity. Referring to the Examples of the Patents, in order to give Lewis acidity to the surface of a carrier such as silica, butylmagnesium chloride and $TiCl_4$ are treated or diethylaluminum chloride is treated. In addition, the catalyst bound to the surface through a functional group having Lewis basicity, if activated with a cocatalyst having Lewis acidity such as aluminoxane, is separated from the surface and causes reactor fouling, and a particle shape of a polymer produced therefrom is not good, and thus it is difficult to use in a slurry process or a gas-phase process.

SUMMARY OF THE INVENTION

The present invention is made in consideration of the problems of the prior art and it is an object of the present invention to provide a supported metallocene catalyst wherein a metallocene catalyst easy to chemically bond to a carrier is supported on a carrier which surface is modified with chemicals, and an olefin polymerization process using the same.

It is another object of the present invention to provide a supported metallocene catalyst that does not cause reactor fouling because it is not separated when polymerizing an olefin and has superior polymerization activity, and an olefin polymerization process using the same.

It is another object of the present invention to provide a supported metallocene catalyst that can prepare an olefin polymer which particle shape follows an unique shape of a carrier and has superior apparent density, and an olefin polymerization using the same.

In order to achieve these objects, the present invention provides a supported metallocene catalyst wherein a metal locene compound is supported on a carrier by contact reacting a) one or more kinds of metallocene compound catalyst ingredient wherein at least one hydrogen radical existing on $R^1$, $R^2$ or B of a metallocene compound represented by the following Chemical Formula 1 or 2 is substituted with an organic radical selected from radicals represented by the following Chemical Formula 3, 4 and 5; and b) a carrier, in the presence of an organic solvent to break a carbon-oxygen bond, a carbon-sulfur bond or a silicone-oxygen bond existing on a radical represented by the Chemical Formula 3, 4 or 5 of the a) metallocene compound catalyst ingredient thereby forming a novel chemical bond between the a) metallocene compound and the b) carrier, characterized in that the b) carrier is a silica prepared by silane-treating a silica dehydrated at a temperature of 500° C. or more to selectively remove hydroxy groups out of hydroxy groups and siloxane groups existing on a silica surface:

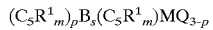
[Chemical Formula 1]

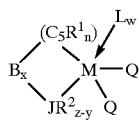
[Chemical Formula 2]

(In the Chemical Formula 1 or 2,

M is a Group 4 transition metal;

Each of $(C_5R^1_m)$ and $(C^5R^1_n)$ is a cyclopentadienyl or substituted cyclopentadienyl, wherein each $R^1$, which may be identical or different, is hydrogen radical, C1–40 alkyl, cycloalkyl, aryl, alkenyl, alkylaryl, arylalkyl, arylalkenyl radical or hydrocarbyl-substituted 14 Group metalloid; or a substituted cyclopentadienyl ligand wherein two neighboring carbon atoms in $C_5$ are connected each other through a hydrocarbyl radical to form one or more 4–16 angular rings;

B, which is a bridge connecting two cyclopentadienyl ligands, or one cyclopentadienyl ligand and $JP^2_{z-y}$ though covalent bonds, is carbon chain alkylene, carbon chain arylene, carbon chain alkenylene, dialkylsilicone, dialkylgermanium, alkyl phophine or alkylamine, $R^2$ is a hydrogen radical, C1–40 alkyl radical, alkenyl radical, aryl radical, alkylaryl radical, or arylalkyl radical;

J is VA Group atom or VIA Group atom;

Q, which may be identical or different, is halogen radical, C1–20 alkyl radical, alkenyl radical, aryl radical, alkylaryl radical, arylalkyl radical or C1–20 alkylidene radical;

L is a Lewis base;

s is 0 or 1, p is 0, 1 or 2, provided that s is 0 when p is o, m is 4 when s is 1, and m is 5 when s is 0;

z, which is an atomic valence of J, is 3 for VA Group atoms, and 2 for VIA Group atoms; and x is 0 or 1, provided that when x is 0, n is 5, y is 1 and w is more than 0, and when x is 1, n is 4, y is 2 and w is 0.)

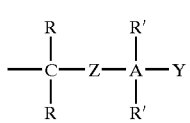
[Chemical Formula 3]

(In the Chemical Formula 3,

Z is an oxygen or sulfur atom;

R, which may be identical or different, is hydrogen radical, C1–40 alkyl, cycloalkyl, aryl, alkenyl, alkylaryl, arylalkyl or arylalkenyl radical;

R', which may be identical or different, is hydrogen radical, C1–40 alkyl, cycloalkyl, aryl, alkenyl, alkylaryl, arylalkyl, arylalkenyl radical, and two R' may be connected each other to form a ring;

Y is C1–40 alkoxy, aryloxy, alkylthio, arylthio, phenyl or substituted phenyl, and it may be connected with R' to form a ring; and A is a carbon or silicone atom, provided that Y must be alkoxy or aryloxy, when Z is a sulfur atom, and Z must be an oxygen atom when Y is alkylthio, arylthio, phenyl or substituted phenyl.)

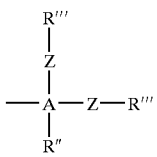
[Chemical Formula 4]

(In the Chemical Formula 4,

Z is an oxygen or sulfur atom, and at least one of Z is an oxygen atom;

R'' is hydrogen radical, C1–40 alkyl, cycloalkyl, aryl, alkenyl, alkylaryl, arylalkyl or arylalkenyl radical, and it may be connected with R''' to form a ring;

R''', which may be identical or different, is hydrogen radical, C1–40 alkyl, cycloalkyl, aryl, alkenyl, alkylaryl, arylalkyl or arylalkenyl radical, and two R''' may be connected each other to form a ring; and A is carbon or silicone atom.)

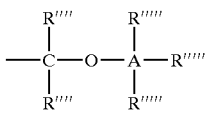
[Chemical Formula 5]

(In the Chemical Formula 5,

R'''', which may be identical or different, is hydrogen radical, C1–40 alkyl, cycloalkyl, aryl, alkenyl, alkylaryl, arylalkyl or arylalkenyl radical;

R''''', which may be identical or different, is hydrogen radical, C1–40 alkyl, cycloalkyl, aryl, alkenyl, alkylaryl, arylalkyl or arylalkenyl radical, and two neighboring R''''' may be connected each other to form a ring;

provided that all R''''' is not an hydrogen radical when at least one R'''' is an hydrogen radical, and all R'''' is not an hydrogen radical when at least one R''''' is an hydrogen radical.; and A is a carbon or silicon atom.)

The present invention also provides an olefin polymerization process using a catalyst system comprising a) a supported metallocene catalyst wherein a metallocene compound is supported on a carrier by contact reacting i) one or more kinds of metallocene compound catalyst ingredient wherein at least one hydrogen radical existing on $R^1$, $R^2$ or B of a metallocene compound represented by the following Chemical Formula 1 or 2 is substituted with an organic radical selected from a group consisting of radical represented by the following Chemical Formula 3, radical represented by the following Chemical Formula 4 and radical represented by the following Chemical Formula 5; and ii) a carrier, in the presence of an organic solvent
to break a carbon-oxygen bond, a carbon-sulfur bond or a silicone-oxygen bond existing on the radical represented by the Chemical Formula 3, 4 or 5 of the i) metallocene compound catalyst ingredient thereby forming a novel chemical bond between i) the metallocene compound and ii) the carrier; and b) one or more kinds of cocatalyst selected from a group consisting of a compound represented by the Chemical Formula 6, a compound represented by the Chemical Formula 7 and a compound represented by the Chemical Formula 8, characterized in that the a) ii) carrier is a silica prepared by silane-treating a silica dehydrated at a temperature of 500° C. or more to selectively remove hydroxy groups out of hydroxy groups and siloxane groups existing on a silica surface:

[Chemical Formula 6]

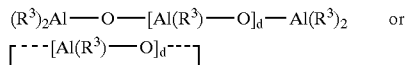

(In the Chemical Formula 6, $R^3$, which may be identical or different, is an halogen radical, C1–40 hydrocarbyl radical or halogen-substituted C1–40 hydrocarbyl radical, and d is an integer of 2 or more.)

  [Chemical Formula 7]

(In the Chemical Formula 7, $R^4$, which may be identical or different, is halogen radical, C1–40 hydrocarbyl radical or halogen-substituted C1–40 hydrocarbyl radical.)

$[L]^+[NE_4]^-$  [Chemical Formula 8]

(In the Chemical Formula 8, $[L]^+$ is a cation consisting of inorganic organic group;

N is a Group 13 atom in Periodic Table; and

E, which may be identical or different, is C6–40 aryl radical, substituted with one or more of halogen radical, C1–40 hydrocarbyl radical, alkoxy, phenoxy radical, C1–40 hydrocarbyl radical comprising nitrogen, phosphorus, sulfur and oxygen atoms.)

In the polymerization process, the b) cocatalyst is preferably one or more kinds of compounds selected from a compound represented by Chemical Formula 6 and a compound represented by the Chemical Formula 7.

In addition, the a) i) metallocene catalyst ingredient is preferably [Z-O—(CH$_2$)$_a$—C$_5$H$_4$]$_2$ZrCl$_2$ (wherein, a is 4~8, and Z is selected from a group consisting of methoxymethyl, t-butoxymethyl, tetrahydropyranyl, tetrahydrofuranyl, 1-ethoxyethyl, 1-methyl-1-methoxyethyl and t-butyl), and the b) cocatalyst is preferably one or more kinds of compounds selected from a compound represented by the Chemical Formula 6 and a compound represented by the Chemical Formula 7.

In addition, the polymerization process is preferably slurry polymerization or gas-phase polymerization.

The silane is preferably an organosilane represented by the Chemical Formula 9 or Chemical Formula 10:

  [Chemical Formula 9]

  [Chemical Formula 10]

(In the Chemical Formula 9 or 10, n is 1, 2 or 3;

X is an halogen; and

R is hydrogen radical or hydrocarbyl functional group.)

DETAILED DESCRIPTION AND THE PREFERRED EMBODIMENTS

The present invention will now be explained in detail.

The present invention provides a supported metallocene catalyst wherein a metallocene compound represented by the above Chemical Formula 1 or 2 easy to prepare a supported catalyst, wherein at least one hydrogen radical existing on $R^1$, $R^2$ or B of Chemical Formula 1 and Chemical Formula 2 is substituted with a radical selected from a group consisting of a radial represented by the Chemical Formula 3, a radical represented by the Chemical Formula 4 and a radical represented by the Chemical Formula 5, is supported on a silica carrier prepared by treating a silica dehydrated at a temperature of 500° C. or more with silane to selectively remove hydroxy groups out of hydroxy groups and siloxane groups existing on a silica surface, and an olefin polymerization process using the supported metallocene catalyst.

Namely, a metallocene compound, which substantially has acetal, ketal, secondary or tertiary alkoxyalkyl, benzyloxy alkyl, substituted benzyloxy alkyl, aryloxy alkyl, dithioacetal, dithioketal, monothioacetal, monothioketal, thioether, or alkoxy silane functional group on a part of its ligand by substituting at least one hydrogen radical existing on $R^1$, $R^2$ or B of the Chemical Formula 1 or 2 with a radical of the Chemical Formula 3, 4 or 5, is chemically reacted with siloxane group on the surface of a silica without hydroxy groups to prepare a supported catalyst, and the supported catalyst is used for an olefin polymerization.

The supported metallocene catalyst of the present invention is prepared by reacting the metallocene compound with a silica that is silane-treated after dehydrated at 500° C. or more.

Generally, a silica dehydrated at 500° C. or more has very reactive siloxane group which is known to react with a compound having an alkoxysilane functional group as shown in the following Equation 1 (J. Am. Chem. Soic. 1995, vol 117, 2112, J. Am. Chem. Soc. 1993, vol 115, 1190). And a patent for a supported metallocene catalyst using the reactivity of the silica dehydrated at high temperature with alkoxysilane group has been already applied (Korean Patent Application Nos. 98-12660, 99-06955, E.P. Laid-open Publication No. 839836)

[Equation 1]

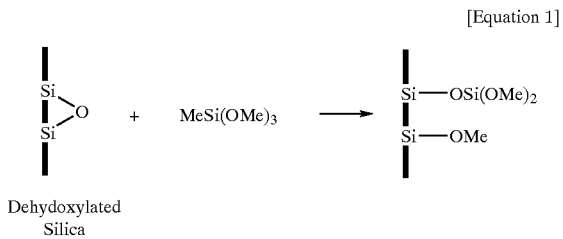

Dehydoxylated Silica

It is also known in Korean Laid-open Patent Publication No. 2001-3325 that a very reactive siloxane group dehydrated at high temperature can react with acetal, ketal, tertiary alkoxy alkyl, benzyloxy alkyl, substituted benzyloxy alkyl, monothioacetal or monothioketal functional group to break carbon-oxygen bond or carbon-sulfur bond existing on the functional group to form a novel chemical bond with a surface.

Following Equation 2, 3, or 4 shows an example of a reaction possibly caused by the metallocene compound of the present invention having acetal, ketal, secondary or tertiary alkoxy alkyl, benzyloxy alkyl, substituted benzyloxy alkyl, aryloxy alkyl, dithioacetal, dithioketal, monothioacetal, monothioketal, thioether or alkoxy silane functional group and a very reactive functional group existing on a silica surface.

[Equation 2]

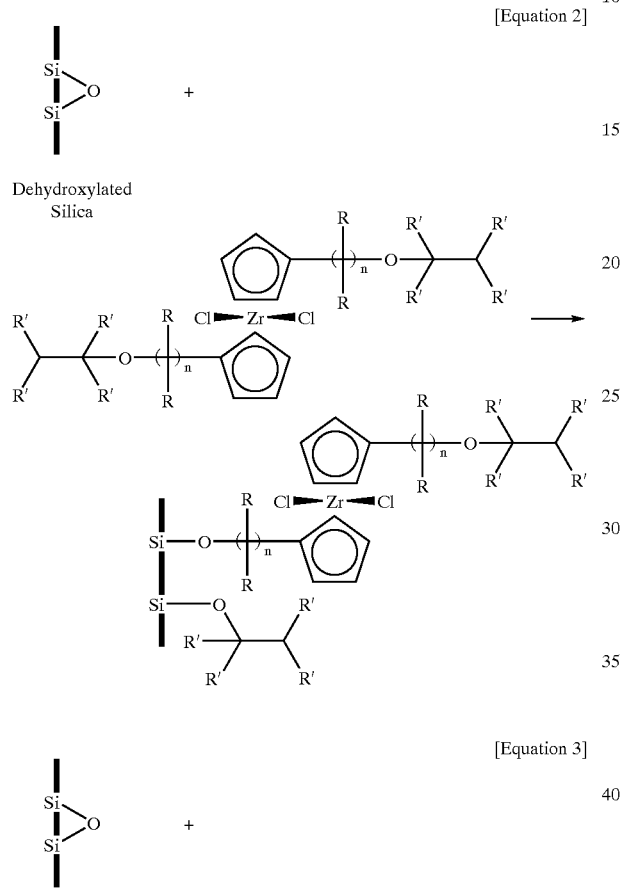

[Equation 3]

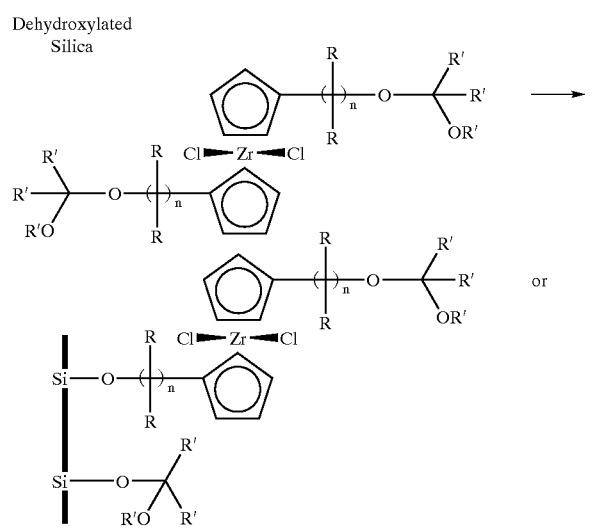

[Equation 4]

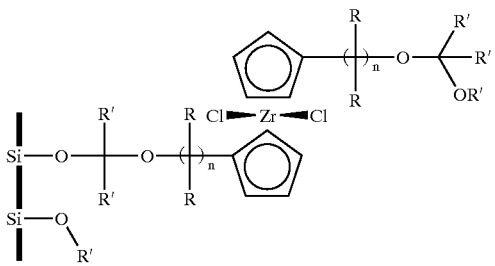

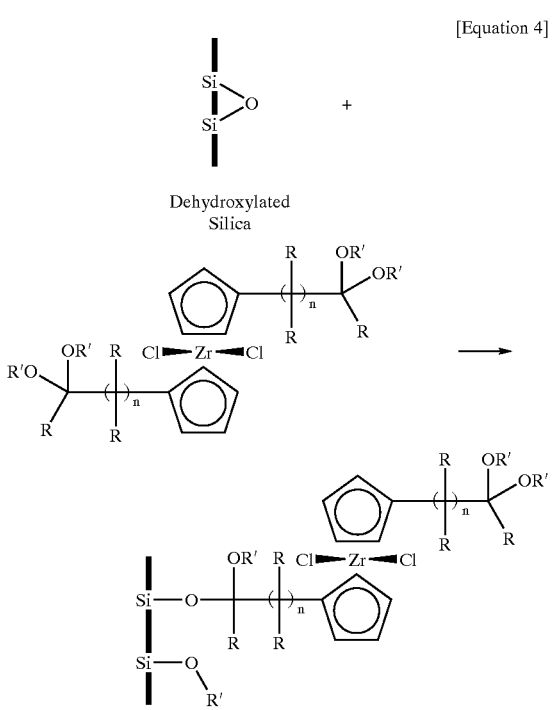

In the Equation 2, 3, or 4, each of R and R', which may be identical or different, is hydrogen radical, alkyl, cycloalkyl, aryl alkenyl, alkylaryl, arylalkyl, arylalkenyl radical or silane radical, and two R' may be connected each other to form a ring, and R" is alkoxy, aryloxy, alkyl, cycloalkyl, aryl, alkenyl, alkylaryl, arylalkyl or arylalkenyl radical, and it may be connected with R' to form a ring.

The reactions shown in the Equations are proved in an experiment to be practically caused on a silica surface.

[Equation 5]

$$\underset{\substack{\text{Si}-\text{OH} \\ \text{Si}-\text{OH} \\ \text{Si}^+ \\ \text{Si}}}{\overset{}{\bigg|}} \quad + \quad \underset{R_3Si}{\overset{R_3Si}{\diagdown}}NH \quad + \quad$$

-continued

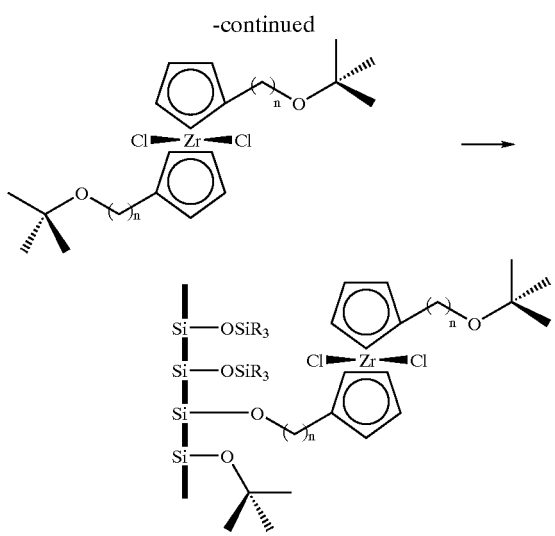

Specifically, according to the Equation 5, the surface of silane-treated silica can block contamination by side reaction when supporting a metallocene catalyst thereon because hydroxy groups on a silica surface are selectively removed, and the activity of a supported catalyst can be maximized.

As a solvent used to prepare a supported metallocene catalyst, most organic solvents including aliphatic hydrocarbon solvent such as hexane, heptane and isobutene, aromatic hydrocarbon solvent such as toluene and benzene, chlorine-substituted hydrocarbon solvent such as dichloromethane, diethylether, ether solvent such as THF, acetone, ethylacetate, etc. can be used, but an aliphatic hydrocarbon such as hexane, heptane and isobutene is preferable.

Reaction temperature is 30° C. below zero to 300° C., and preferably room temperature to 100° C. After preparing a supported catalyst, a solvent is removed by layer separation and the catalyst is dried to obtain supported catalyst powder, which may be used in an olefin polymerization. Alternatively, after preparing a supported catalyst using the same solvent as that used in an olefin polymerization and removing solvent by layer-separation (and, if necessary, washing several time with the same solvent), the catalyst slurry can be used in subsequent activation and polymerization without drying.

The prepared supported metallocene catalyst can be used in an olefin polymerization together with a cocatalyst selected from a compound represented by the Chemical Formula 6, a compound represented by the Chemical Formula 7, and a compound represented by the Chemical Formula 8 alone or in combination.

The examples of the compounds represented by the Chemical Formula 6 include methylaluminoxane, ethylaluminoxane, isobutylaluminoxane, butylaluminoxane, etc.

The examples of alkyl metal compounds represented by the Chemical Formula 7 include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyidietylaluminum, triphenylaluminum, tri-p-tollylaluminum, dimethylaluminummethoxide, dimethylaluminumethoxide, etc.

The examples of the compounds represented by the Chemical Formula 8 include triethylammoniumtetraphenylborate, tributylammoniumtetraphenylborate, trimethylammoniumtetraphenylborate, tripopylammoniumtetraphenylborate, trimethylammoniumtetrakis(p-tollyl)borate, tripropylammoniumtetrakis(p-tollyl)borate, triethylammoniumtetrakis(o,p-dimethylphenyl)borate, trimethylammoniumtetrakis(o,p-dimethylphenyl)borate, tributylammoniumtetrakis(p-trifluoromethylphenyl)borate, trimethylammoniumtetrakis(p-trifluoromethylphenyl) borate, tributylammoniumtetrakispentafluorophenylborate, N,N-diethylaniliniumtetraphenylborate, N,N-diethylaniliumtetrakispentafluorophenylborate, diethylammoniumtetrakispentafluorophenylborate, triphenylphosphoniumtetraphenylborate, trimethylphosphoniumtetraphenylborate, triethylammoniumtetraphenylaluminate, tributylammoniumtetraphenyulaluminate, trimethylammoniumtetraphenylaluminate, tripropylammoniumtetraphenyulaluminate, trimethylammoniumtetrakis(p-tollyl)aluminate, tripropylammoniumtetrakis(p-tollyl)aluminate, triethylammoniumtetrakis(o,p-dimethylphenyl)aluminate, tributylammoniumtetrakis(p-trifluoromethylphenyl) aluminate, trimethylammoniumtetrakis(p-trifluoromethylphenyl)aluminate, tributylammoniumtetrakispentafluorophenylaluminate, N,N-diethylaniliumtetraphenylalumninate, N,N-diethylaniliniumtetraphenylaluminate, N,N-diethylaniliumtetrakispentafluorophenylaluminate, diethylammoniumtetrakispentafluorophenylaluminate, triphenylphosphoniumtetraphenylaluminate, trimethylphophoiumtetraphenylaluminate, triethylammoniumtetraphenylborate, tributylammoniumtetraphenylborate, trimethylammoniumtetraphenylborate, tripropylammoniumtetraphenylborate, trimethylammoniumtetrakis(p-tollyl)borate, tripropylammoniumtetrakis(p-tollyl), triethylammoniumtetrakis(o,p-dimethylphenyl)borate, trimethylammoniumtetrakis(o,p-dimethylphenyl)bporate, tributylammoniumtetrakis(p-trifluoromethylphenyl)borate, trimethylammoniumtetrakis(p-trifluoromethylphenyl) borate, tributylammoniumtetrakispentafluorophenylborate, N,N-diethylaniliniumtetraphenylborate, N,N-diethylaniliumtetraphenylborate, N,N-diethylaniliumtetrakispentafluorophenylborate, diethylammoniumtetrakispentafluorophenylborate, triphenylphosphoniumtetraphenylborate, triphenylcarboniumtetraphenylborate, triphenylcarboniumtetraphenylaluminate, triphenylcarboniumtetrakis(p-trifluoromethylphenyl)borate, triphenylcarboniumtetrakispentafluorophenylborate, etc.

As a solvent for preparing an olefin polymer using a catalyst system consisting of the supported metallocene catalyst and the cocatalyst, C3–12 aliphatic hydrocarbon such as propane, butane, isobutene, pentane, hexane, heptane, nonane, decane and an isomer thereof, an aromatic hydrocarbon such as benzene and toluene, chloro-substituted hydrocarbon such as dichloromethane and chlorobenzene can be used alone or in combination.

In addition, it is possible to prepare an olefin polymer using the metallocene compound catalyst and the cocatalyst in a gas-phase or slurry-phase without specific solvent.

Examples of olefin monomers that can be polymerized using the metallocene compound catalyst or supported metallocene catalyst and a cocatalyst include ethylene, alpha-olefin, cyclic olefin, etc. and diene olefin monomer or triene olefin monomer, polyene monomer having two or more of double bonds can be polymerized. The examples of the monomers include ethylene, propylene, 2-butene, 2-pentene, 1-butene, 1-pentene, 4-methyl1-pentene, 1-hexene, 1-heptene, 1-decene, 1-undecene, 1-dodecene, 1-tetradecene, 1-hexadecene, 1-icocene, norbonene, norbonadiene, ethylidenenorbonene, vinylnorbonene, dicyclopentadiene, 1,4-butadiene, 1,5-pentadiene, 1,6-hexadiene, styrene, alpha-methylstyrene, divinylbenzene, 3-chloromethylxtyrene, etc. and two or more kinds of these monomers can be copolymerized.

Polymerization is preferably performed at 25° C. below zero to 500° C. under 0.001 to 3000 pressure, and cocatalyst is preferably added in moles of 1 to 30000 times of metallocene moles.

In the present invention, the order of contact and introduction of a supported catalyst, a cocatalyst, a solvent and monomers are not specifically limited. Namely, the supported metallocene catalyst and cocatalyst can be simultaneously introduced to perform a polymerization, or real polymerization can be performed after activation or prepolymerization.

The real polymerization can be performed in an appropriate suspended solvent with introducing monomers, or it can be performed in gas-phase or slurry-phase without solvent. Prepolymer can be obtained by introducing a supported catalyst, a cocatalyst and a solvent, agitating at an appropriate temperature and pressure, and filtering the reactant or separating layer. Activated reactant can be obtained by the same method as prepolymer without olefin. In order to reduce methylaluminoxane (MAO), the supported catalyst can be firstly treated with an organic aluminum compound prior to using in a polymerization.

The supported metallocene catalyst of the present invention can be effectively used in an olefin polymerization recycling a cocatalyst as described in Korean Patent Application Nos. 98-12659 and 99-3027, and in U.S. Pat. No. 6,340,728.

[Difference from the Prior Art]

U.S. Pat. No. 5,814,574 has disclosed a polymerization catalyst ingredient wherein a metallocene compound having Lewis acid functional group selected from alkoxyalkyl, heterocyclo oxygen radical or alkyl heterocyclooxygen radical is supported on an inorganic carrier by binding the metallocene compound to the inorganic carrier. In addition, U.S. Pat. No. 5,767,209 has disclosed preparation of a supported catalyst by binding a metallocene compound with Lewis basicity including oxygen, silicon, phosphorus, nitrogen, or sulfur to an inorganic carrier in the absence of aluminoxane, and a polymerization process by contacting the supported catalyst with at least one olefins at a temperature and a pressure sufficient to cause a polymerization.

Examples of these Patents use butylmagnesium chloride and $TiCl_4$-treated silica or diethylaluminum chloride-treated silica as an inorganic carrier in order to give Lewis acidity, and use bis(tetrahydro-3-furanmethylcyclopentadienylzirconium dichloride and bis (methoxyethylcyclopentadienyl)zirconium dichloride as a catalyst precursor. And, they asserted that a metallocene compound having Lewis acid functional groups is supported on an inorganic carrier surface through "binding".

Generally, a term "binding" is used when two kinds of compounds still maintain each original condition even though they are bound through any chemical bond ('Hackh's Chemical Dictionary' vol. 4 written by Julius Grant and published from McGraw-Hill book Company explained "binding" as "holding together"). The term "binding" is used a lot for explaining a mechanism of enzyme ('Biochemistry' vol. 3 pp 8–10 written by Lubert Stryker and published from W. H. Freeman and Company describe an appropriate example.).

When the catalyst "bound" to surface through a functional group with Lewis basicity is activated with a cocatalyst with Lewis acidity, a catalyst is separated from surface to cause reactor fouling and particle shape becomes poor. Therefore, the catalyst is difficult to use in a slurry process or gas-phase process.

As explained, according to the present invention, a metallocene compound having acetal, ketal, secondary or tertiary alkoxyalkyl, benzyloxy alkyl, substituted benzyloxy alkyl, aryloxy alky, dithioacetal, dithioketal, monothioacetal, monothioketal, thioether or alkoxy silane functional group on a part of its ligand is reacted with a silica dehydrated at 500° C. or more and having very reactive functional groups on its surface to break a carbon-oxygen bond, a carbon-sulfur bond or a silicone-oxygen bond existing on the functional group to form a novel chemical bond with a surface thereby forming a novel silica-metallocene compound. Particularly, surface hydroxy groups are removed by modification through silane-treatment on a silica surface and catalyst contamination source is removed, and thus the catalyst of the present invention can exceed the activity of the existing catalysts even with a small amount.

Comparative Examples 3 and 4 show that the supported catalyst of the present invention differs from those of U.S. Pat. Nos. 5,814,574 and 5,767,209. Specifically, when [2-ethoxyethyl-O—$(CH_2)_6$—$C_5H_4$]$ZrCl_2$, which has similar structure to the catalysts used in the Examples of the Patents, has relatively high Lewis basicity because it consists of primary alkyl only, and has a structure good to binding because it has 4 oxygen atoms, is used in a polymerization while using the silica used in the present invention having very reactive siloxane group or $MgCl_2$ described as a preferable carrier in line 4, column 57 of the U.S. Pat. No. 5,814,574 as a carrier, fouling seriously occurred and particle shape could not be controlled.

Meanwhile, [t-butyl-O—$(CH_2)_6$—$C_5H_4$]$_2ZrCl_2$ compound that has t-butyl ether group with little Lewis basicity due to a steric hindrance effectively causes support reaction asserted in the present invention, and thus no fouling occurs and particle shape can be controlled. It is known that t-butylether can be effectively used as a protection group for alcohol because it has little Lewis basicity and t-butyl group can be broken relatively easily (Tetraherdron Letter, vol 29, 1988, 2951 p).

Specifically, when the supported catalyst bound to surface through Lewis base functional groups claimed in the above patents is activated with aluminoxane during polymerization reaction, aluminoxane is separated from surface because it has Lewis acidity, and thus reactor fouling occurs and produced particle shape is not uniform, rendering it unusable in a slurry or gas-phase polymerization. It is well known that aluminoxane has Lewis acidity (J. Am. Chem. Soc. 1995, vol. 117, p 6465).

In addition, when a catalyst having no functional group capable of reacting with silica as claimed in U.S. Pat. No. 5,324,800, which maybe bound to a carrier surface through week bonds, is activated with aluminoxane, aluminoxane is separated from surface, and thus reactor fouling occurs and produced particle shape is not uniform, rendering it unusable in a slurry or gas-phase polymerization (Comparative Example 3).

When the supported metallocene catalyst of the present invention, wherein a part of a ligand of metallocene compound is attached to a silica surface through strong chemical bond by reacting acetal, ketal, secondary or tertiary alkoxy alkyl, benzyloxy alkyl, substituted benzyloxy alkyl, aryloxy alkyl, dithioacetal, dithioketal, monothioacetal, monothioketal, thioether or alkoxysilane functional group with a silica dehydrated at high temperature of 500° C. or more and having highly reactive functional group on its surface to break carbon-oxygen, carbon-sulfur or silicon-oxygen bond existing on the functional group thereby forming a novel chemical bond with a surface, is activated with a cocatalyst such as aluminoxane, nothing is separated from the surface and thus reactor fouling does not occur when polyolefin is prepared by slurry or gas-phase polymerization, and particle shape and apparent density of produced polymer is superior, rendering it suitable for slurry or gas-phase polymerization process.

The present invention will now be explained in more detail with reference to the following Examples and Comparative Examples. However, these are to illustrate the present invention and the present invention is not limited to them.

EXAMPLE

Organic reagent and solvent required in catalyst preparation and polymerization are Aldirch Company products and they are purified by standard method. Ethylene is polymerized after passing through moisture and oxygen filtering equipment a high-purity product from Applied Gas Technology Company, and contact with air and moisture is blocked in all steps of catalyst synthesis, support and polymerization to enhance the reproductiveness of the experiment.

In order to prove structure of a catalyst, spectrum was obtained using 300 MHz NMR (Brucker).

An apparent density was measured according to the methods set in DIN 53466 and ISO R 60 using an apparent density tester (APT Institute fr Prftechnik product. Apparent Density Tester 1132).

Example 1

(Synthesis of [t-butyl-O—$(CH_2)_6$—$C_5H_4]_2ZrCl_2$)

t-Butyl-O—$(CH_2)_6$—Cl was prepared from 6-chlorohexanol according to the process described in Tetrahedron Lett. 2951, 1988. 1 equivalent of NaCp (2.0 M THF solution) was introduced therein and the reactant was agitated overnight at room temperature. Water was added thereto to separate an organic layer, the organic layer was dehumidified with $MgSO_4$ anhydride and solvent was removed therefrom, and then it was vacuum-distilled to obtain t-butyl-O—$(CH_2)_6$—$C_5H_5$ (80° C./0.1 mmHg). Yield from 6-chlorohexanol was 56%.

1.349 g of the compound were dissolved in 5 Ml of THF and 1 equivalent of hexane solution was introduced therein at 40° C. Temperature of the solution was slowly elevated to room temperature and the solution was agitated for 3 hours. The solution was introduced in a flask including 0.5 equivalents of $ZrCl_4(THF)_2$ and agitated at 55° C. for 40 hours. Solvent was removed by distillation, and 30 Ml of hexane were added thereto and hexane was removed by filtering while hot to obtain 1.711 g of desired product (yield 92%). The compound was used to prepare a supported catalyst without further purification (yield 60%, b.p. approximately 80° C./approximately 0.11 mmHg).

$^1$H NMR (300 MHz, CDCl3): 6.28 (t, J=2.6 Hz, 2H), 6.19 (t, J=2.6 Hz, 2H), 3.31 (t, 6.6 Hz, 2H), 2.62 (t, J=8 Hz), 1.7 1.3 (m, 8H), 1.17 (s, 9H).

$^{13}$C NMR (CDCl3): 135.09, 116.66, 112.28, 72.42, 61.52, 30.66, 30.61, 30.14, 29.18, 27.58, 26.00.

(Preparation of Surface-modified Carrier)

Silica (Grace Davison Company product XPO 2412) was dehydrated at 800° C. for 5 hours while adding vacuum. 10.0 g of dehydrated silica were introduced in a glass reactor and a dropping funnel was equipped. A dropping funnel was closed and silica was vacuum-dried for approximately 2 hours.

25 Ml of hexane where 3 mmol of hexamethyl disilazane were dissolved were incorporated in the dropping funnel, and then they were added to silica of vacuum condition under nitrogen pressurization. 30 Ml of hexane were further added, and the reactant was reacted while agitating at 70° C. for 2 hours. Hexane was removed by layer-separation, and then the reactant was washed with 30 Ml of hexane 3 to 5 times while observing color change with litmus test paper. After washing, remaining hexane solution was removed using a cannular, and then hexane was completely removed by pressurizing while slowly elevating temperature to 300° C. The reactant was vacuum-dried under 0.1 mmHg for 4 hours while maintaining temperature of 300° C. to obtain siliazane-treated silica carrier.

(Preparation of a Supported Catalyst)

1.0 g of the silazane-treated silica (Grace Davison Company product XPO 2412) were introduced in a glass reactor, 40 Ml of hexane were added thereto, and 10 Ml hexane where 200 mg of [t-butyl-O—$(CH_2)_6$—$C_5H_4]_2ZrCl_2$ catalyst were dissolved were added thereto. The mixture was reacted while agitating at 85° C. for 3 hours. Hexane was removed by layer-separation, washing with 30 ml of hexane and depressurization to obtain a supported catalyst.

(Polymerization)

100 mg of the prepared supported catalyst were quantified and incorporated into a glass reactor in a dry box, and then the reactor was closed and taken out of the dry box. Then, 50 ml of purified hexane were introduced in the reactor and aluminoxane (MAO) where heptane or hexane was dissolved were introduced therein in an amount corresponding to 1.0 mmol-Al. The mixture was agitated at 40° C. for 30 minutes, 30 psig of ethylene pressure was added thereto and the mixture was further agitated at room temperature for 30 minutes to perform prepolymerization.

To an 1 liter-Buchi reactor including 660 ml of hexane where1.50 mmol of triethylaluminum are dissolved, the prepared prepolymerization catalyst was introduced without contact with air, and then polymerization was performed at 80° C. while continuously adding pressure of 130 psig. Ethylene was evaporated and the reactant was filtered while opening the reactor, and then the reactant was dehydrated in an oven of 80° C. to obtain a polymer.

The amount (activity) of produced polyethylene for the prepared catalyst was 115 g. The apparent density of obtained polymer was measured to approximately 0.35 g/ml and no reactor fouling occurred.

Comparative Example 1

A supported catalyst was prepared by the same method as in Example 1, using t-butyl-O—$(CH_2)_6$—$C_5H_4]_2ZrCl_2$ prepared in Example 1 as a catalyst and silica (Grace Davison Company product XPO 2412) which was dehydrated with adding vacuum at 800° C. for 5 hours without silazane-treatment as a carrier, and then prepolymerization and real polymerization were performed. The amount (activity) of produced polyethylene was 90 g, no fouling occurred during prepolymerization and real polymerization, produced particle shape was good, and apparent density was 0.34 g/ml.

Comparative Example 2

A supported catalyst was prepared by the same method as in Example 1, using bis(octylcyclopentadienyl)zirconium dichloride having no functional group capable of reacting with silica as claimed in U.S. Pat. No. 5,324,800 as a catalyst and the silazane-treated silica prepared in Example 1 as a carrier, and then prepolymerization and polymerization were performed. The amount (activity) of produced polyethylene was 51 g, fouling seriously occurred during prepolymerization and polymerization, produced particle shape was not good, and apparent density was 0.05 g/ml.

Comparative Example 3

A compound [2-ethoxyethyl-O—$(CH_2)_6$—$C_5H_4]_2ZrCl_2$, which has a similar structure to those used in Examples of U.S. Pat. Nos. 5,814,574 and 5,767,209, has relatively high Lewis basicity because it consists of primary alkyl only, and has a good structure to binding because it has 4 oxygen atoms, was synthesized by the method described in J. Organomet. Chem. Vol. 552 (1998), 313), and it was supported on a dried silica that is not silane-treated by the same method as in Example 1, and then prepolymerization and real polymerization were performed.

The amount of produced polyethylene was very small as 10.7 g, fouling seriously occurred, and particle shape could not be controlled and thus an apparent density was 0.06 g/ml.

Comparative Example 4

A supported catalyst wherein [2-ethoxyethyl-O—$(CH_2)_6$—$C_5H_4]_2ZrCl_2$ used in Example 3 is supported on a $MgCl_2$ carrier described as a preferable carrier in line 4, column 57 of U.S. Pat. No. 5,814,574 through "binding" was used for polymerization.

26.5 mg of [2-ethoxyethyl-O—$(CH_2)_6$—$C_5H_4]_2ZrCl_2$ were mixed with 500 mg of $MgCl_2$ anhydride pulverized with a ball mill, the mixture was agitated at room temperature for 2 hours in the presence of 30 ml of hexane. Hexane was removed by layer-separation, and the mixture was washed again with 50 ml of hexane and vacuum depressurized to remove remaining hexane. 100 mg of the supported catalyst was introduced in a glass reactor, 250 ml of hexane was added thereto, 1.6 ml of MAO were introduced therein, and then the mixture was agitated at 80° C. for 5 minutes in an incubator. Polymerization was performed with adding 40 psig of ethylene.

Reactor fouling occurred, and particle shape could not be controlled well. The amount of produced polyethylene (PE) was 7.4 g, and an apparent density was 0.10 g/ml.

Since in the supported metallocene catalyst of the present invention, a part of a ligand of a metallocene compound is attached to a silica surface through strong chemical bonds, no catalyst is separated from the surface when activated, and thus no reactor fouling occurs when preparing polyolefin by slurry or gas-phase polymerization, and particle shape and apparent density of produced polymer are superior, rendering it suitable for a slurry of gas-phase polymerization process.

What is claimed is:

1. A Method for preparing a supported metallocene catalyst comprising steps of:

a) dehydrating silica at 500° C. or more, and treating the dehydrated silica with silane represented by following Chemical Formula 9 to selectively remove hydroxy groups existing on a silica surface to prepare a silane-treated silica as a carrier, b) reacting the silane-treated silica with a metallocene compound introduced a functional group in the presence of an organic solvent to support a metallocene compound on the carrier, and wherein the metallocene compound is one or more kinds of metallocene compound catalyst ingredients that at least one hydrogen radical existing on $R^1$ or $R^2$ of the metallocene compound represented by following Chemical Formula 1 or 2 is substituted with an organic radical selected from a group consisting of a radical represented by the following Chemical Formula 3, Chemical Formula 4 and Chemical Formula 5 to break a carbon-oxygen bond, a carbon-sulfur bond or a silicon-oxygen bond existing on a radical represented by the following Chemical Formula 3, 4 or 5 thereby forming a novel chemical bond between the metallocene compound and the carrier:

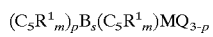   Chemical Formula 1

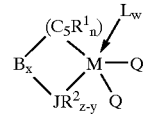   Chemical Formula 2 wherein in the Chemical Formula 1 or 2,

M is a Group 4 transition metal, $(C_5R^1_m)$ and $(C_5R^1_n)$ are independently a cyclopentadienyl or substituted cyclopentadienyl ligand wherein each $R^1$, which may be identical or different, is hydrogen radical, a C1–40 alkyl, cycloalkyl, aryl, alkenyl, alkylaryl, arylalkyl, arylalkenyl radical, or a hydrocarbyl-substituted Group 14 metalloid, or a substituted cyclopentadienyl ligand wherein two neighboring carbon atoms in C5 are connected to each other

TABLE 1

| | Catalyst | Carrier | Activity |
|---|---|---|---|
| Example 1 | [t-butyl-O—$(CH_2)_6$—$C_5H_4]_2ZrCl_2$ | $HMDS-SiO_2$ | 115 |
| Comparative Example 1 | [t-butyl-O—$(CH_2)_6$—$C_5H_4]_2ZrCl_2$ | $SiO_2$ | 90 |
| Comparative Example 2 | [$CH_3(CH_2)_7$—$C_5H_4]_2ZrCl_2$ | HMDS-SiO2 | 51 |
| Comparative Example 3 | [2-ethoxyethyl-O—$(CH_2)_6$—$C_5H_4]_2ZrCl_2$ | SiO2 | 10.7 |
| Comparative Example 4 | [2-ethoxyethyl-O—$(CH_2)_6$—$C_5H_4]_2ZrCl_2$ | MgCl2 | 7.4 | through a hydrocarbyl radical to form one or more 4–16 angular rings;

B, which is a bridge connecting two cyclopentadienyl ligands or one cyclopentadienyl ligand and $JR^2_{z-y}$ through covalent bonds, is a carbon chain alkylene, carbon chain arylene, carbon chain alkenylene, dialkylsilicone, dialkylgermanium, alkyl phosphine or alkylamine;

$R^2$ is a hydrogen radical, C1–40 alkyl radical, alkenyl radical, aryl radical, alkylaryl radical, or arylalkyl radical;

J is a VA Group atom or a VIA Group atom;

Q, which may be identical or different, is a halogen radical, C1–20 alkyl radical, alkenyl radical, aryl radical, alkylaryl radical, arylalkyl radical or C1–20 alkylidene radical;

L is a Lewis base;

s is 0 or 1, and p is 0, 1 or 2, provided that s is 0 when p is 0, m is 4 when s is 1, and m is 5 when s is 0;

z is an atomic valence of J, which is 3 for VA Group atoms and 2 for VIA Group atoms; and x is 0 or 1, provided that when x is 0, n is 5, y is 1, and w is more than 0, and when x is 1, n is 4, y is 2, and w is 0,

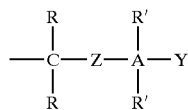

Chemical Formula 3 wherein in the Chemical Formula 3,

Z is an oxygen or sulfur atom;

R, which may be identical or different, is a hydrogen radical, or a C1–40 alkyl, cycloalkyl, aryl, alkenyl, alkylaryl, arylalkyl, or arylalkenyl radical;

R', which may be identical or different, is a hydrogen radical, or a C1–40 alkyl, cycloalkyl, aryl, alkenyl, alkylaryl, arylalkyl, or arylalkenyl radical, and the two R' may be connected with each other to form a ring;

Y is a C1–40 alkoxy, aryloxy, alkylthio, arylthio, phenyl, or substituted phenyl, and it may be connected with a R' to form a ring;

provided that when Z is a sulfur atom, Y must be an alkoxy or aryloxy, and when Y is an alkylthio, arylthio, phenyl or substituted phenyl, Z must be an oxygen atom; and A is a carbon or silicon atom,

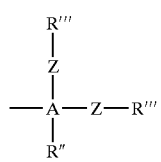

Chemical Formula 4 wherein in the Chemical Formula 4,

Z is an oxygen or sulfur atom, and at least one Z is an oxygen atom;

R" is a hydrogen radical, or a C1–40 alkyl, cycloalkyl, arylalkenyl, alkylaryl, arylalkyl, or arylalkenyl radical, and it may be connected with an R''' to form a ring;

R''', which may be identical or different, is a hydrogen radical, or a C1–40 alkyl, cycloalkyl, aryl, alkenyl, alkylaryl, arylalkyl, or arylalkenyl radical, and the two R''' may be connected with each other to form a ring; and A is a carbon or silicon atom,

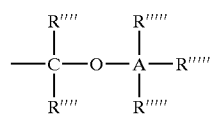

Chemical Formula 5 wherein in the Chemical Formula 5,

R'''', which may be identical or different, is a hydrogen radical, or a C1–40 alkyl, cycloalkyl, aryl, alkenyl, alkylaryl, arylalkyl, or arylalkenyl radical;

R''''', which may be identical or different, is a hydrogen radical, or a C1–40 alkyl, cycloalkyl, aryl, alkenyl, alkylaryl, arylalkyl, or arylalkenyl radical, and two neighboring R''''' may be connected with each other to form a ring;

provided that when at least one R'''' is a hydrogen radical, all R''''' are not hydrogen radicals, and when at least one R''''' is a hydrogen radical, all R'''' are not hydrogen radicals; and A is carbon or silicon atom, $(R^3Si)_2NH$ <span style="float:right">Chemical Formula 9</span> wherein in the Chemical Formula 9, $R^3$ is a hydrogen radical or a hydrocarbyl functional group.

2. A process for polymerizing an olefin using a catalyst system comprising:

a) a supported metallocene catalyst, and b) a cocatalyst selected from a group consisting of a compound represented by the following Chemical Formula 6, Chemical Formula 7 and Chemical Formula 8, wherein a supported metallocene catalyst is prepared by the method comprising steps of:

dehydrating silica at 500° C. or more, and treating the dehydrated silica with silane represented by following Chemical Formula 9 to selectively remove hydroxy groups existing on a silica surface to prepare a silane-treated silica as a carrier, reacting the silane-treated silica with a metallocene compound introduced a functional group in the presence of an organic solvent to support a metallocene compound on the carrier, and wherein the metallocene compound is one or more kinds of metallocene compound catalyst ingredients that at least one hydrogen radical existing on $R^1$ or $R^2$ of the metallocene compound represented by following Chemical Formula 1 or 2 is substituted with an organic radical selected from a group consisting of a radical represented by the following Chemical Formula 3, Chemical Formula 4 and Chemical Formula 5 to break a carbon-oxygen bond, a carbon-sulfur bond or a silicon-oxygen bond existing on a radical represented by the following Chemical Formula 3, 4 or 5 thereby forming a novel chemical bond between the metallocene compound and the carrier:

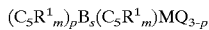  Chemical Formula 1

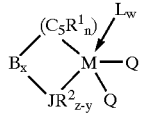  Chemical Formula 2 wherein in the Chemical Formula 1 or 2,

M is a Group 4 transition metal, $(C_5R^1_m)$ and $(C_5R^1_n)$ are independently a cyclopentadienyl or substituted cyclopentadienyl ligand wherein each $R^1$, which may be identical or different, is a hydrogen radical, a C1–40 alkyl, cycloalkyl, aryl, alkenyl, alkylaryl, arylalkyl, arylalkenyl radical, or a hydrocarbyl-substituted Group 14 metalloid, or a substituted cyclopentadienyl ligand wherein two neighboring carbon atoms in C5 are connected to each other through a hydrocarbyl radical to form one or more 4–16 angular rings;

B, which is a bridge connecting two cyclopentadienyl ligands or one cyclopentadienyl ligand and $JR^2_{z-y}$ through covalent bonds, is a carbon chain alkylene, carbon chain arylene, carbon chain alkenylene, dialkylsilicone, dialkylgermanium, alkyl phosphine or alkylamine;

$R^2$ is a hydrogen radical, or a C1–40 alkyl radical, alkenyl radical, aryl radical, alkylaryl radical, or arylalkyl radical;

J is a VA Group atom or a VIA Group atom;

Q, which may be identical or different, is a halogen radical, C1–20 alkyl radical, alkenyl radical, aryl radical, alkylaryl radical, arylalkyl radical, or C1–20 alkylidene radical;

L is a Lewis base;

s is 0 or 1, and p is 0, 1 or 2, provided that s is 0 when p is 0, m is 4 when s is 1, and m is 5 when s is 0;

z is an atomic valence of J, which is 3 for VA Group atoms and 2 for VIA Group atoms; and x is 0 or 1, provided that when x is 0, n is 5, y is 1, and w is more than 0, and when x is 1, n is 4, y is 2, and w is 0,

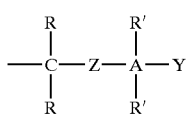  Chemical Formula 3 wherein in the Chemical Formula 3,

Z is an oxygen or sulfur atom;

R, which may be identical or different, is a hydrogen radical, or a C1–40 alkyl, cycloalkyl, aryl, alkenyl, alkylaryl, arylalkyl, or arylalkenyl radical;

R', which may be identical or different, is a hydrogen radical, or a C1–40 alkyl, cycloalkyl, aryl, alkenyl, alkylaryl, arylalkyl, or arylalkenyl radical, and the two R' may be connected with each other to form a ring;

Y is a $C_{1-40}$ alkoxy, aryloxy, alkylthio, arylthio, phenyl or substituted phenyl, and it may be connected with a R' to form a ring;

provided that when Z is a sulfur atom, Y must be an alkoxy or aryloxy, and when Y is an alkylthio, arylthio, phenyl or substituted phenyl, Z must be an oxygen atom; and A is a carbon or silicon atom,

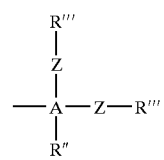  Chemical Formula 4 wherein in the Chemical Formula 4,

Z is an oxygen or sulfur atom, and at least one Z is an oxygen atom;

R" is a hydrogen radical, or a C1–40 alkyl, cycloalkyl, arylalkenyl, alkylaryl, arylalkyl, or arylalkenyl radical, and it may be connected with a R'" to form a ring;

R'", which may be identical or different, is a hydrogen radical, or a $C_{1-40}$ alkyl, cycloalkyl, aryl, alkenyl, alkylaryl, arylalkyl, or arylalkenyl radical, and the two R'" may be connected with each other to form a ring; and A is a carbon or silicon atom,

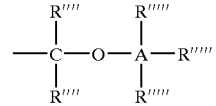  Chemical Formula 5 wherein in the Chemical Formula 5,

R"", which may be identical or different, is a hydrogen radical, or a C1–40 alkyl, cycloalkyl, aryl, alkenyl, alkylaryl, arylalkyl, or arylalkenyl radical;

R""', which may be identical or different, is a hydrogen radical, or a C1–40 alkyl, cycloalkyl, aryl, alkenyl, alkylaryl, arylalkyl, or arylalkenyl radical, and two neighboring R""' may be connected with each other to form a ring;

provided that when at least one R"" is a hydrogen radical, all R""' are not hydrogen radicals, and when at least one R""' is a hydrogen radical, all R"" are not hydrogen radicals; and A is a carbon or silicon atom,

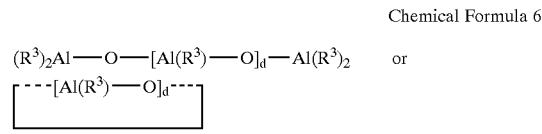  Chemical Formula 6 wherein in the Chemical Formula 6, $R^3$, which may be identical or different, is a halogen radical, or a C1–40 hydrocarbyl radical or halogen substituted C1–40 hydrocarbyl radical; and d is an integer of 2 or more,

  Chemical Formula 7 wherein in the Chemical Formula 7, $R^4$, which may be identical or different, is a halogen radical, a C1–40 hydrocarbyl radical or a halogen substituted C1–40 hydrocarbyl radical,

  Chemical Formula 8 wherein in the Chemical Formula 8,

[L]$^+$ is a cation consisting of an inorganic organic group;

N is a Group 13 atom of the periodic table; and

E, which may be identical or different, is a C6–40 aryl radical substituted with one or more of a halogen radical, a C1–40 hydrocarbyl, alkoxy, or a phenyl radical, or a C1–40 hydrocarbyl radical comprising nitrogen, phosphorus, sulfur and oxygen atoms, $$(R^3Si)_2NH \qquad \text{Chemical Formula 9}$$

wherein in the Chemical Formula 9, R$^3$ is a hydrogen radical or a hydrocarbyl functional group.

3. The process for polymerizing an olefin according to claim 2, wherein the b) cocatalyst is one or more kinds of compounds selected from a compound represented by the above Chemical Formula 6 and a compound represented by the above Chemical Formula 7.

4. The process for polymerizing an olefin according to claim 2, wherein the a) i) metallocene compound is [Z-O—(CH$_2$)$_a$—C$_5$H$_4$]$_2$ZrCl$_2$ (wherein a is 4~8, Z is selected from a group consisting of methoxymethyl, t-butoxymethyl, tetrahydropyranyl, tetrahydrofuranyl, 1-ethoxyethyl, 1-methyl -1-methoxyethyl and t-butyl) and the b) cocatalyst is one or more kinds of compounds selected from a group consisting of a compound represented by the above Chemical Formula 6 and a compound represented by the above Chemical Formula 7.

5. The process for polymerizing an olefin according to claim 2, wherein the polymerization is a slurry polymerization or a gas-phase polymerization.

6. The method according to claim 1, wherein in Formula 9, R$^3$ is a hydrocarbyl functional group.

7. The process according to claim 2, wherein in Chemical Formula 9, R$^3$ is a hydrocarbyl functional group.

* * * * *